(12) United States Patent
Haber

(10) Patent No.: US 9,163,975 B2
(45) Date of Patent: Oct. 20, 2015

(54) SYSTEM AND METHOD FOR MONITORING THE REMAINING CAPACITY AND OPERATIONAL STATE OF MULTIPLE SHRED BINS

(71) Applicant: BABACO ALARM SYSTEMS, INC., Moonachie, NJ (US)

(72) Inventor: Greg Haber, Woodbury, NY (US)

(73) Assignee: BABACO ALARM SYSTEMS, INC., Moonachie, NJ (US)

( * ) Notice: Subject to any disclaimer, the term of this patent is extended or adjusted under 35 U.S.C. 154(b) by 0 days.

(21) Appl. No.: 14/493,158

(22) Filed: Sep. 22, 2014

(65) Prior Publication Data

US 2015/0084777 A1   Mar. 26, 2015

Related U.S. Application Data

(60) Provisional application No. 61/881,722, filed on Sep. 24, 2013, provisional application No. 61/941,590, filed on Feb. 19, 2014.

(51) Int. Cl.
*G01F 23/292*   (2006.01)

(52) U.S. Cl.
CPC .................... *G01F 23/292* (2013.01)

(58) Field of Classification Search
CPC .............. B65D 90/48; G01F 23/292
See application file for complete search history.

(56) References Cited

U.S. PATENT DOCUMENTS

| | | | | |
|---|---|---|---|---|
| 7,213,777 | B2* | 5/2007 | Podrovitz | B02C 18/0007 241/100 |
| 8,994,546 | B2* | 3/2015 | Breed | G01J 5/0846 340/426.19 |
| 2006/0180686 | A1* | 8/2006 | Podrovitz | B02C 18/0007 241/101.2 |
| 2010/0025509 | A1* | 2/2010 | Matlin | G01F 23/292 241/100 |
| 2013/0002443 | A1* | 1/2013 | Breed | G01J 5/0846 340/686.1 |

* cited by examiner

*Primary Examiner* — Van Trieu
(74) *Attorney, Agent, or Firm* — Epstein Drangel LLP; Robert L. Epstein

(57) ABSTRACT

The bins are situated in locations at one or more sites. A monitoring station located remotely from the bins is operably connected to each of the bins. Each bin includes an internal compartment having a given capacity for retaining paper to be shredded. An IR-LED distance measuring sensor is mounted within each bin for generating an output which is a function of the level of paper present in the compartment. The bin electronics monitors the status of the sensor and the power input to the bin. Signals are transmitted the monitoring station when the output of the sensor indicates that bin is filled to a pre-set percentage of its capacity and when a sensor or power failure are detected. At the monitoring station, information as to the remaining capacity and operational state of each bin is displayed and stored.

20 Claims, 3 Drawing Sheets

SYSTEM AND METHOD FOR MONITORING THE REMAINING CAPACITY AND OPERATIONAL STATE OF MULTIPLE SHRED BINS

CROSS-REFERENCE TO RELATED APPLICATIONS

Priority is claimed on Provisional Patent Application Ser. No. 61/881,722, filed Sep. 24, 2013, entitled "Shred Bin System" and on Provisional Patent Application No. 61/941,590, filed Feb. 19, 2014, entitled "Monitoring System for Shred Bins with IR-LED Distance Measuring Sensor."

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to bins for retaining paper products to be shredded for collection and more particularly to a system and method for monitoring the remaining capacity and operational state of multiple shred bins in locations at one or more sites.

2. Description of Prior Art Including Information Disclosed Under 37 CFR 1.97 and 1.98

Paper shredders are well known in the art for disposing of paper containing confidential or otherwise sensitive material. Paper is commonly shredded in one of two ways. It can be shredded on site using self-contained portable shredders located on the premises, such as in offices or homes. However, paper is often collected and shipped to a remote location for shredding by larger machines in order to increase efficiency and reduce cost or for security concerns and requirements.

In the latter instance, containers into which paper to be shredded can deposited for collection are located throughout a facility. For example, in a multiple floor office building, containers or multiple containers could be positioned various points or at a central location on each floor or within each office suite. Locations of containers can be spread out in every department and have multiple containers at high use areas. The collection of containers is very time consuming and drivers do not know the specific area where containers are located in every building and every floor. The amount of time needed to locate every container and to empty same is a huge waste of valuable labor and equipment use if the container is not at a high enough fill level. Conventional collection systems do not direct drivers to specific containers and provide their location in a building. Paper deposited in those containers would be collected periodically and sent by vehicle or other means of transport to a remote location for shredding. Today the collection of paper from containers is typically done according to a weekly, biweekly of monthly schedule.

The containers themselves are usually box-like and often referred to as a "shred bin." The shred bin commonly consists of a cabinet with an internal paper retaining compartment and an entrance slot or opening on or near the top of the cabinet through which paper can be deposited into the compartment. A fabric bag or form fitting plastic insert is placed in the container to catch the paper and as a means to remove the paper from the container. Further, an access door is provided, typically at the front of the cabinet, for removing the paper retained in the compartment. The removed paper is collected and transported to a remote facility for shredding.

Presently, collection vehicles are dispatched to each site where the shred bins are located on a scheduled basis, regardless of whether the shred bins are full to capacity or not. Accordingly, many of the bins will not have been filled to capacity when the contents are collected.

Further, when the scheduled collection occurs, many of the bins may have been full to capacity for some time. Those bins have been unable to accept additional materials and thus have been unusable for that time period.

The present invention is intended to increase the efficiency of the collection of the contents of multiple shred bins by equipping each shred bin with a sensor capable measuring the remaining capacity of the bin compartment and means for ascertaining the operational state of the electronics of the bin. That information is transmitted from the bin, preferably using the Internet, to a remote central monitoring station. At the monitoring station, the capacity and operational information for each of the bins in the system is displayed such that vehicles can be dispatched to the bin sites only when the bins are approaching full capacity or require repair.

BRIEF SUMMARY OF THE INVENTION

In accordance with one aspect of the present invention, a system for monitoring the remaining capacity and operational state of multiple shred bins is provided. The bins are situated in locations at one or more sites. A monitoring station located remotely from the bin sites is operably connected to each of the bins. Each bin includes a container with an internal compartment having a given capacity for retaining paper to be shredded. An IR-LED distance measuring sensor is mounted within each bin for generating an output which is a function of the level of paper present in the retaining compartment of the bin. The bin also has means for monitoring the status of the sensor and the power input to the bin. Means are provided for transmitting signals from the bin to the remote station when the output of the sensor indicates that the retaining compartment is filled to a pre-set percentage of its capacity and when the status monitoring means indicates a sensor or power failure are included in the bin. At the monitoring station, means are provided for displaying the remaining capacity and operational state of each bin.

The system also includes means for manually selecting additional bins to be emptied and for providing a signal to the transmitting means identifying the additional bins.

The system includes a microprocessor and a voltage transfer circuit, the microprocessor being connected to receive the sensor output and to provide an input to the voltage transfer circuit. The microprocessor is connected to and monitors the state of the sensor and the power input to the bin.

The transmitting means includes a cellular modem connected to the Internet for transmitting signals from the bin to the monitoring station.

The system also includes a vehicle capable of traveling to the site of a shred bin to empty or repair the bin. A dispatcher at the monitoring station monitors the capacity and operational signals received from the bins. A vehicle is dispatched to the site of the bin by the dispatcher to empty or repair the bin when necessary.

The sensor output preferably takes the form of a pulse width modulated analog signal. The sensor preferably includes a position sensitive detector and a signal processing circuit.

A movement detector is connected to the microprocessor for indicating an unauthorized attempt to access the bin contents. The movement detector is actuated to generate an unauthorized access signal upon detecting the tipping the bin or turning the bin over. When the microprocessor senses the unauthorized access signal it causes the modem to alert the central monitoring station dispatched that an unauthorized access attempt has been made on the bin.

In accordance with another aspect of the present invention, a method for monitoring the remaining capacity and operational state of multiple shred bins is provided. The bins are operably connected to a remote monitoring station. The monitoring station has a display indicating the remaining capacity and operational state of the bins. A vehicle can be dispatched to a bin site to empty or repair a bin. The method includes: placing multiple shred bins each having a paper retaining compartment in locations at one or more sites; equipping each of the bins with an IR-LED distance measuring sensor; measuring the level of the contents of the compartment of each bin with the distance measuring sensor and generating signals indicating the measured level; generating signals upon detection of a power or sensor failure of the bin; transmitting the signals indicating the remaining capacity and operational state of the bin from the bin to the monitoring station; displaying information from the transmitted signals at the monitoring station; and dispatching a vehicle to the site of a bin when the display indicates that the bin requires emptying or repair.

The method also includes transmitting signals to the monitoring station indicating when the bin has been emptied and displaying the time and date that a bin was last emptied. Periodically thereafter, for example every few hours but at least once a day, a "heartbeat" signal will be transmitted to the central station by each bin. That "heartbeat" signal will provide the central monitoring station with an overview of the state of the electronics on the bin. The "heartbeat" signal will typically include an indication of the remaining capacity of the bin, the status of the sensor, the status of the modem, the status of the power to the unit and the state of back-up battery of the bin. The "heartbeat" signal can also be used to determine which units have not reported in within a specific amount of time, and thus are in need of service.

An icon appears on the display at the monitoring station when a power or sensor failure is detected at a bin. The displayed icon is cleared when the power or sensor failure has been corrected.

The method further includes storing the transmitted capacity signals and operational state signals. The system will display the last empty time and date of each bin, whether a failure icon is associated with each bin, and the current content level of each bin.

BRIEF DESCRIPTION OF THE SEVERAL VIEWS OF DRAWINGS

To these and to such other objects that may hereinafter appears, the present invention relates to a system and method for monitoring the remaining capacity and operational state of multiple shred bins as described in detail in the following specification and recited in the annexed claims, taken together with the accompanying drawings, in which like numerals refer to like parts and in which:

DETAILED DESCRIPTION OF THE INVENTION

The present invention relates to a system and method which remotely monitors the paper levels and operational state of multiple shred bin container units situated in locations at one or more sites. Each shred bin unit is equipped with an IR-LED distance measuring sensor. The sensor determines the percentage of the container filled with paper. The unit sends a service ticket when a bin is filled and alarms as to the status of the unit to a remotely located central monitoring station where a dispatcher can arrange to send a vehicle to the shred bin site for emptying or repair of the bin when required.

The system is comprised of a plurality of shred bins each having a cabinet enclosing an internal compartment for retaining paper to be shredded. An IR-LED distance measuring sensor and cellular modem are situated in each shred bin unit. The sensor unit is mounted inside the container proximate the top of the cabinet facing downward toward the paper in the compartment. The sensor unit has a battery back-up for operation when the AC power is removed.

Figure 1:
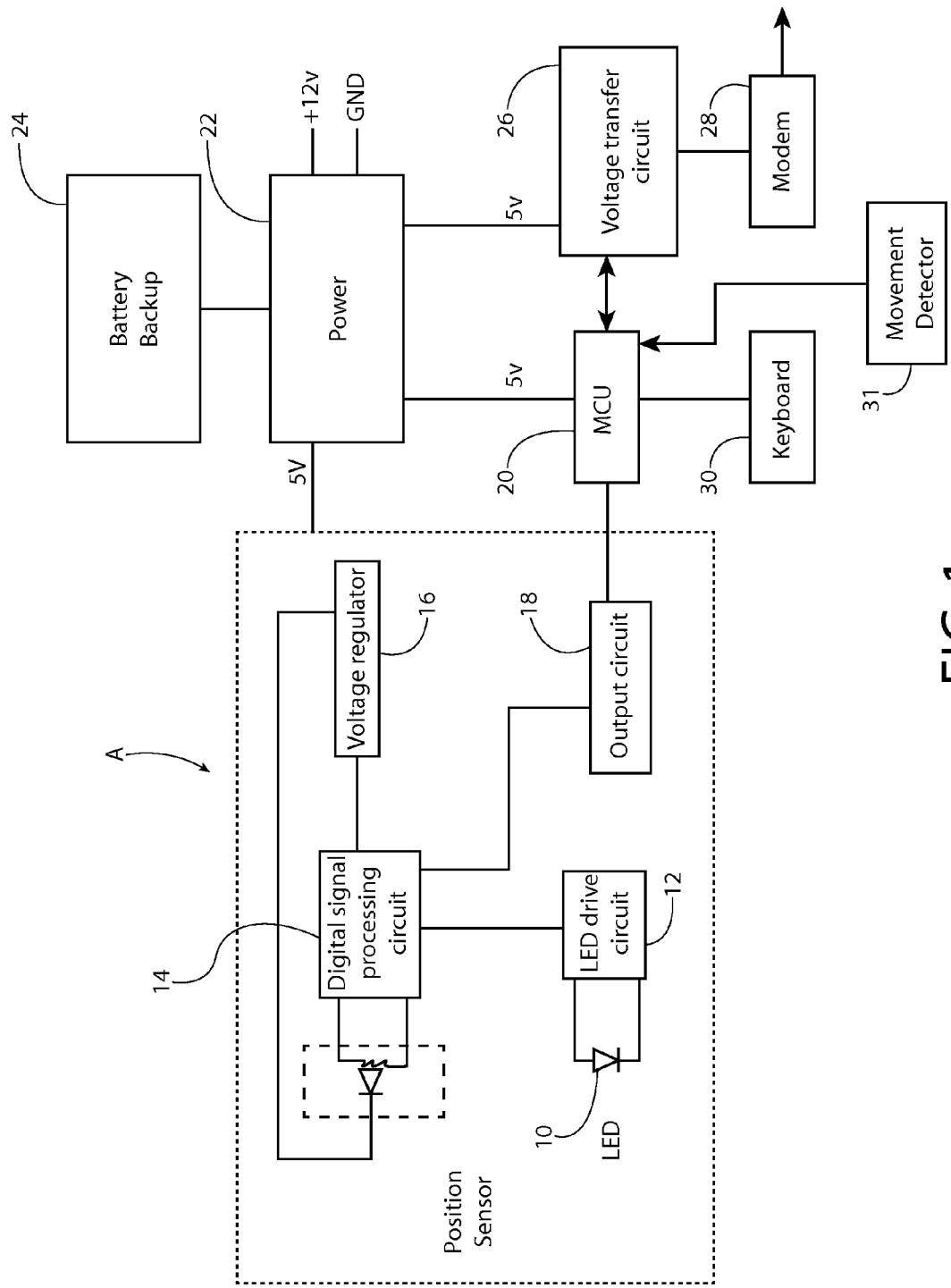
FIG. 1 is a block diagram of the circuitry in a shred box of the present invention.

FIG. 1 is a block diagram of the electronics situated in each shred bin. As depicted in the figure, the IR-LED distance measuring sensor, generally designated A, includes an IR-LED 10 connected to a LED drive circuit 12. Drive circuit 12 is connected to a digital signal processing circuit 14 which receives power from a voltage regulator 16. The output of circuit 14 is connected through output circuit 18 to the signal input of a microprocessor 20.

Microprocessor 20 receives a +5 volt output from power circuit 22. Circuit 22 also provides power to the other circuit components; including sensor A. Power circuit 22 receives a 12 volt DC signal from a transformer/A to D converter (not shown) connected to a 120v AC source. A battery back-up 24 is connected to power circuit 22 to provide power to the electronics in the event that a power failure is detected by the microprocessor. Microprocessor 20 monitors the state of power circuit 22 to detect a power failure and the output of sensor A to detect a failure of the sensor. A voltage should be present on the sensor output line at all times. If there is no voltage present on the sensor output, or if the voltage level is out of range (high or low), the sensor is in failure mode and a sensor failure signal will be sent.

Power circuit 22 also provides power to a voltage transfer circuit 26 which receives the output of microprocessor 20 and provides an input to a cellular modem 28. Modem 28 is connected to the remote central monitoring station, preferably through an Internet connection. However, the signals could be provided to the central monitoring station by other means such as a wireless transmitter and receiver, Wi-Fi, cellular, satellite, a telephone line, cable etc.

Also connected to microprocessor 20 is a keyboard 30 or other conventional data input device which allows an authorized person to create and communicate a message to the central monitoring station. In particular, keyboard 30 allows a person to create and send a message to the central monitoring station requesting that a the driver of a vehicle dispatched to empty a bin at a particular site also empty or repair other bins at that site, even if those others bin are not filled to capacity, or if the other bins require immediate maintenance for some reason.

Further, it is desirable to equip the shred bin cabinet with a movement detector 31 which detects if the shred bin is tipped over or turned upside down, for example to obtain unauthorized access to the contents of the bin. Detector 31 can be a simple mercury switch which sends a signal to the microprocessor indicating that the bin has been moved in a manner that indicates unauthorized access which in turn causes the microprocessor to generate a signal to modem 28 through the voltage transfer circuit to alert the dispatcher at the central monitoring station that there has been an unauthorized access attempt.

One paper level sensor which has been found to function well in this system is Product No. GP2Y0A60SZ0F/GP2Y0A60SZLF Distance Measuring Sensor Unit available from Sharp. That unit includes an integrated combination of PSD (position sensitive detector), an IR-LED (infrared emitting diode) and a signal processing circuit. The unit outputs a voltage signal which is a function of the distance between the sensor and the level of paper in the bin compartment. Accordingly, the output of the sensor represents the remaining capacity of the paper retaining compartment of the bin. The unit is capable of measuring distances between in the range of 10 to 150 cm. The unit output is in the form of a pulse width modulated analog signal which is provided to the input port of microprocessor 20.

Many conventional containers have a bag to collect paper. These bags do not typically expand to the perimeter of the container unless paper is present to force the bag to the extremities. Further, some containers now use a pre-formed plastic insert to catch the deposited paper. If a sonic sensor is used when a bag is present, false readings occur because the bag is detected by the sensor, resulting in a false fill level reading. Further, when a sonic sensor is used with the plastic sensor, the sonic wave reflects off the plastic and also provides a false reading. By using a narrow focused LED generated light beam, a more accurate and reliable reading is obtained with no interference from any bag or insert.

Microprocessor 20 can be an 8-pin flash-based 8-bit CMOS Microprocessor with an A/D converter, such as Part No. PIC12F683, available from Microchip Technology Inc., or a comparable circuit. Microprocessor 20 receives the analog output from sensor A and creates an output signal which is processed and forwarded to the central monitoring station when the sensor detects that the bin compartment is at a pre-set level. The pre-set level is determined to be the most efficient level for the dispatcher to initiate the bin emptying process. The electronics also send signals indicating the time and date that the bin is emptied, that the AC power to the bin has been disconnected, that the AC power to the bin has been restored, that the sensor has failed to provide a correct voltage output and that the sensor failure has been corrected.

Thus, the central station can monitor the capacity remaining in each shred bin. Further, it can monitor the operational state of the electronics in each shred bin by receiving signals indicating when a power or sensor failure has occurred and when the power or sensor failure has been corrected.

Figure 2:
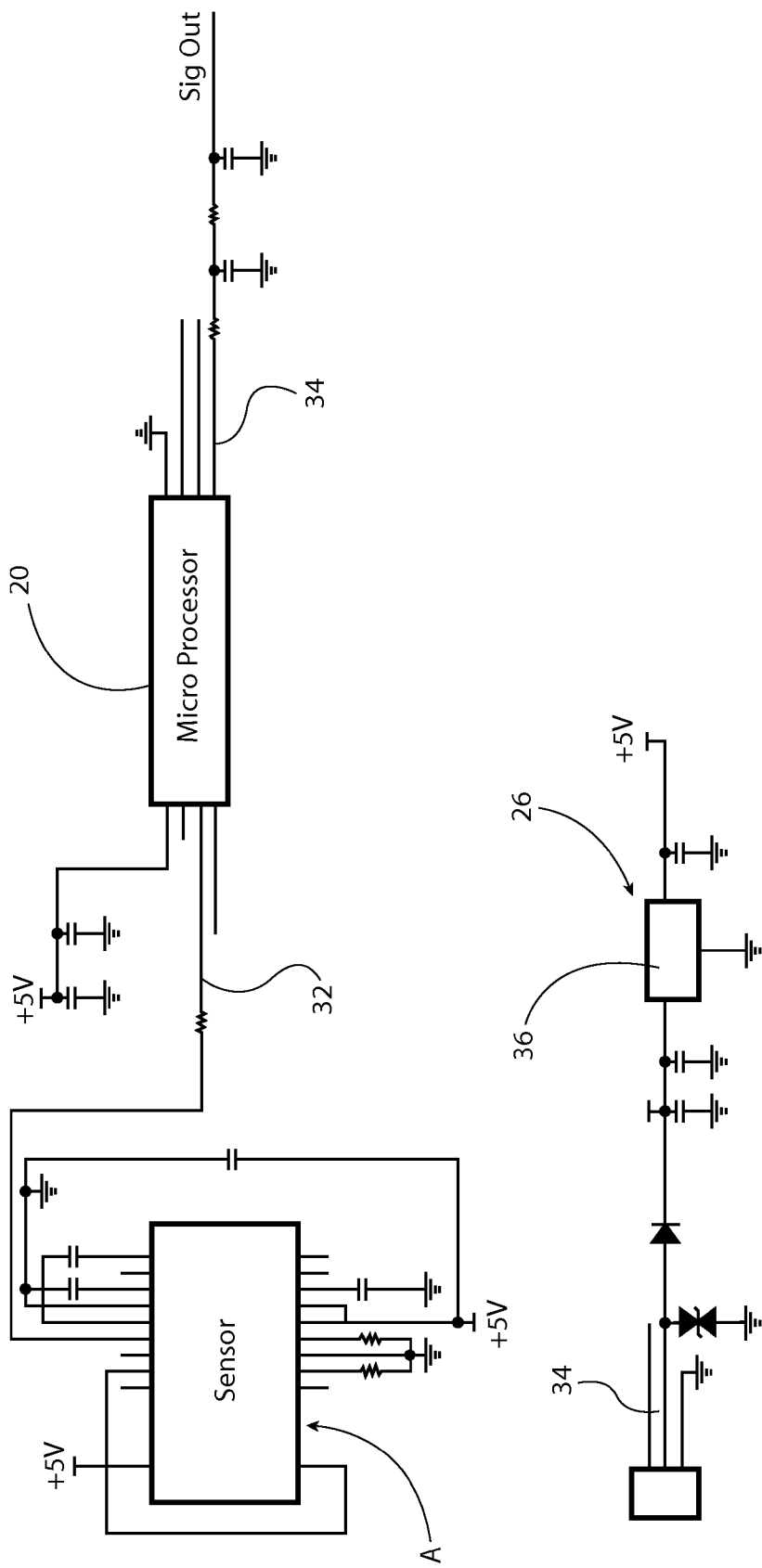
FIG. 2 is a flow chart of the operation of the circuitry of FIG. 1.

FIG. 2 is a schematic diagram of the sensor, microprocessor and voltage transfer circuit. Sensor A receives +5 volt power outputs from power circuit 22 and generates an analogue signal which is a function of the remaining capacity of the bin on lead 32 to the input of microprocessor 20. Microprocessor 20 also receives +5 volt power signals from power circuit 22. The signal output from the microprocessor appears on lead 34 which is connected to the input of voltage transfer circuit 26. Circuit 26, in turn, provides the input to cellular modem 28.

The voltage transfer circuit 26 includes a three terminal positive voltage regulator 36 encapsulated in a plastic package, which may take the form of Part No. CJ78D05, available from TY Semiconductor Co., Ltd, or the equivalent thereof. That regulator employs internal current limiting, thermal shut-down and safe area protection, making it suitable for use under conditional normally encountered in a shred bin.

Figure 3:
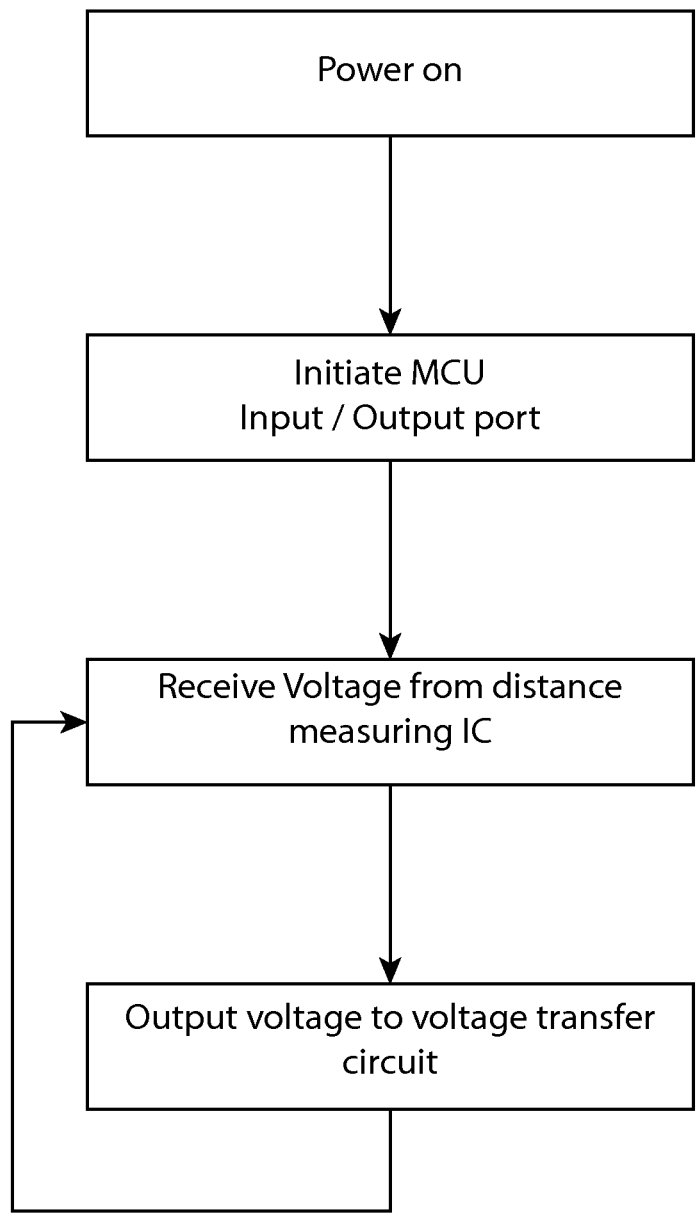
FIG. 3 is a schematic diagram of the circuitry of FIG. 1.

FIG. 3 is a software flow chart for the circuitry of the unit. As indicated on that figure, when the circuit powers on, the microprocessor is initiated and receives the output of sensor A at input port of the microprocessor. The sensor output is a voltage signal which is a function of the remaining capacity of the bin. The microprocessor generates an output voltage signal based on the sensor output to voltage transfer circuit 26.

The unit will send a signal to the central monitoring station when the sensor detects that the bin is X % full, a pre-set percentage reflecting the most efficient time to have shred bin emptied. This is in contrast to current shred bin collection systems wherein bins are emptied on a predetermined schedule basis, whether the bins are full or not. The present invention will increase the efficiency of the system by emptying the bins only when the bins are at or near full capacity.

In addition, when a vehicle stop to empty a full bin at a particular site is scheduled by the dispatcher, other bins at the site in the same general area as the full bin can be designed to be serviced or emptied at the same time. Bins with a remaining capacity above a particular X % level will be skipped and serviced at a later date.

The unit will also send an automatic service ticket to the central monitoring station when a bin is filled to a desired fill level. That service ticket can be used by the dispatcher to schedule a vehicle to empty the bin.

The unit will send an alert when the bin is filled to a desired level. The unit will send an alert when the bin is emptied to desired level. The time and date when the bin was last emptied is displayed at the central monitoring station and stored in a log memory at the station such that the history of each bin can be ascertained.

The unit will send an alert when the microprocessor detects that the bin is disconnected from its AC power source. The unit will send an alert when the microprocessor detects that the bin is reconnected to the AC power. The unit will also send an alert when the backup battery is approaching a low level.

The unit will send alert when the microprocessor detects a sensor failure indicated by lack of correct voltage from the sensor output. The unit will send an alert when the microprocessor detects that the sensor failure has been corrected by the return of correct voltage from the sensor.

At the central monitoring station a display such as a computer display screen with a user interface is monitored by a dispatcher. The display will consist of a list indicating the location of each of the bins connected to the station, a data grid with status information for each connected bin, and an alarm display section. A log memory containing the an audit history for each bin can be displayed in a separate pop up that is accessed when a "View History" button associated to the data grid is actuated.

The keyboard 30 associated with the microprocessor in a bin can be used by an authorized individual to advise the dispatcher that it is desired to have certain bins emptied other than the bin with full or near full capacity. The display at the central station will display a checkbox which is capable of causing an e-mail to be generated to a predefined e-mail group that will let the driver of a dispatched vehicle know to empty the additional bins checked, along with the ones above having a remaining capacity which causes a display of an Alarm Status indicating that the bin is to be emptied.

The display lists each shred bin in the system and the Alarm Status thereof. The alarm Status is displayed in the Alarm Status section of display screen by a red alarm light icon proximate each listed bin needing emptying or repair. It is a goal of the invention is to keep each bin not in Alarm Status by clearing the alerts in the Alarm Section associated with the bins as promptly as possible. If there are no alarms displayed in the Alarm Section, the red alarm lights will be turned off. The display will provide the dispatcher with enough information to maximize the effectiveness of the collection vehicle by alerting the vehicle drivers as to exactly which bins to empty while the driver is on location at a particular site.

When the sensor in a bin senses that the bin is full or nearly full (that is, filed to pre-determined X % of capacity) the bin will go into alarm status. It will then transmit an Alarm Status signal and a service ticket is created. This will only occur when the paper level first crosses thru the pre-determined capacity threshold, for purposes of this example 85% of the bin capacity (15% remaining capacity). If the bin is filled to 87% capacity, the service ticket will be created immediately. If the next day the bin is filled to 92% capacity, the bin electronics will not generate another Alarm Status signal until the bin is emptied or until the bin reaches full (100%) capacity.

When a bin has reached 100% capacity, the bin will stay in Alarm Status mode and a second ticket will be generated. The alarm will be stored in the audit history memory.

When the bin is emptied to a level equal to a pre-determined level less than 85% (in this example), the bin electronics will alert the central monitoring station of the time and date the bin was emptied. Upon being emptied, another service ticket is generated and the red alarm status light associated with that bin on the central station display will be cleared, assuming there are no other alarms pending for that bin. The time and date that the bin was emptied are posted on the display and stored in the audit history memory. In this way, a dispatcher can have quick feedback as to the last time each bin was emptied without having to consult the audit history memory each time.

If a power disconnect event occurs, the bin electronics detects same and sends the appropriate signal to the central monitoring station. That causes an alarm to show in the alarm section of the display and a red alarm light icon appears on the display screen proximate the listed bin to show alert status. The time and date of that event is recorded in the audit.

When power is restored to the bin, the bin electronics detects same and sends the appropriate signal to the central monitoring station. That will cause the alarm status to be cleared and the red alarm status light to be deactivated, assuming there are no other alarms associated with that bin. The time and date of power restoration event is recorded in the audit history memory for future reference.

If a sensor failure event occurs, the bin electronics detects same and sends the appropriate signal to the central monitoring station. That causes an alarm to show in the alarm section of the display and a red alarm light icon appears on the display screen proximate the listed bin to show alert status. The time and date of that event is recorded in the audit.

When the electronics detects that the operation of the sensor has been restored, the bin electronics detects same and sends the appropriate signal to the central monitoring station. That will cause the alarm status to be cleared and the red alarm status light icon to be deactivated, assuming there are no other alarms associated with that bin. The time and date of sensor operation restoration event is recorded in the audit history memory for future reference.

The central monitoring station can monitor the state of the electronics of the bins in the system. Periodically, for example every few hours but at least once a day, each bin will automatically transmit a "heartbeat" signal to the central monitoring station to provide the station with an overview of the state of the electronics of the bin. The "heartbeat" signal will typically include an indication of the remaining capacity of the bin, the status of the sensor, the status of the modem, the status of the power to the unit and the state of back-up battery of the bin. The "heartbeat" signal can also be used by the dispatcher at the central monitoring station to determine which units have not reported in within a specific amount of time, and thus to identify which units have electronics in need of service.

The computer or software interface at the central monitoring station invention which receives, processes, displays and stores the bin status information can be programmed to periodically display the audit history for all of the bins in the system.

Further, by selecting certain checkboxes or providing a minimum threshold input in a giving geographic area in the data grid displayed at the central monitoring station and actuating a Submit command, the dispatcher can generate an e-mail to vehicle drivers in the field designating which other bins at the same site that should be emptied or repaired, even if those bins have not reached the pre-determined level or if the other bins require immediate maintenance. This will increase efficiency because a driver is going to a specific geographic area and it may be wise to empty the containers in that area if they are above a certain percentage full.

It can now be appreciated that the present invention relates to a system and method for monitoring the remaining capacity and operational state of multiple shred bins in locations at one or more sites. The system includes a central monitoring station located remotely from the bins and operably connected to each of the bins, preferably through Internet connection. Each of the bins includes a cabinet or container with an internal compartment having a given capacity for retaining paper to be shredded. An IR-LED distance measuring sensor circuit is situated within each bin for generating an output which is a function of the level of paper present in the retaining compartment of the bin and thus the remaining capacity of the bin. The status of the sensor and the power input to the bin are monitored. Signals from the bin are transmitted to the remote central monitoring station when the output of the sensor indicates that the retaining compartment is filled to a pre-set percentage of its capacity and when a sensor or power failure is detected. A display at the monitoring station displays an indication of the remaining capacity and operational state of each bin.

The method includes monitoring the remaining capacity and operational state of multiple shred bins operably connected to the remote central monitoring station. The station has a display indicating the remaining capacity and operational state of the bins. A vehicle is provided which can be dispatched to a bin site to empty or repair a bin. Multiple shred bins each having a paper retaining compartment are situated in locations at one or more sites. Each of the bins is equipped with an IR-LED distance measuring sensor. The level of the contents of the compartment of each bin is measured by the sensor. Signals indicating the measured level are generated. Signals are also generated upon detection of a power or sensor failure of the bin. The signals indicating the remaining capacity and operational state of the bin are transmitted from the bin to the monitoring station. At the monitoring station the information from the transmitted signals indicating the remaining capacity and operational state of the bin at the monitoring station is displayed. A vehicle is dispatched to the site of a bin when the display associated with that bin indicates that the bin requires emptying or repair.

Periodically signal will be transmitted to the central monitoring station by each bin to provide the central monitoring station with an overview of the state of the electronics on the bin. That signal can also be used by the dispatcher to determine which units have not reported in within a specific amount of time, and thus have electronics which are in need of service.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. A system for monitoring the remaining capacity and operational state of multiple shred bins in locations at one or more sites, comprising a monitoring station located remotely from the bins and operably connected to each of the bins, each of the bins comprising a container with an internal compartment having a given capacity for retaining paper to be shredded, an IR-LED distance measuring sensor within each bin for generating a output which is a function of the level of paper present in the retaining compartment of the bin, means for monitoring the status of the sensor and the power input to the bin, means for transmitting signals from the bin to the remote station when the output of the sensor indicates that the retaining compartment is filled to a pre-set percentage of its capacity and when the status monitoring means indicates a sensor or power failure and means at the monitoring station for displaying the remaining capacity and operational state of each bin.

2. The system of claim 1 further comprising means for manually selecting additional bins to be emptied and for providing a signal to the transmitting means identifying the additional bins.

3. This system of claim 1 further comprising a microprocessor and a voltage transfer circuit, the microprocessor being connected to receive the sensor output and to provide an input to the voltage transfer circuit.

4. The system of claim 3 wherein the microprocessor monitors the state of the sensor and the power input.

5. The system of claim 1 wherein the transmitting means comprises a modem connected to the Internet for transmitting signals from the bin to the monitoring station.

6. The system of claim 1 further comprising a display at the monitoring station indicating the remaining capacity and operational state of each bin.

7. The system of claim 6 further comprising a vehicle capable of traveling to the site of a shred bin to empty or repair same and a dispatcher at the monitoring station monitoring signals received from the bins and dispatching the vehicle to the site of a bin to empty or repair the bin.

8. The system of claim 1 wherein the sensor output comprises a pulse width modulated analog signal.

9. The system of claim 1 wherein said transmitting means periodically transmits a signal indicating an overview of the state of the electronics of the bin.

10. The system of claim 1 further comprising a movement detector connected to the microprocessor for indicating an unauthorized attempt to access the bin contents.

11. A method for monitoring the remaining capacity and operational state of multiple shred bins operably connected to a remote monitoring station having a display indicating the remaining capacity and operational state of the bins, and a vehicle which can be dispatched to a bin site to empty or repair a bin, the method comprising the following steps:
  (a) placing multiple shred bins each having a paper retaining compartment in locations at one or more sites;
  (b) equipping each of the bins with an IR-LED distance measuring sensor;
  (c) measuring the level of the contents of the compartment of each bin with the distance measuring sensor and generating signals indicating the measured level;
  (d) generating signals upon detection of a power or sensor failure of the bin;
  (d) transmitting the signals indicating the remaining capacity and operational state of the bin from the bin to the monitoring station;
  (e) displaying information from the transmitted signals indicating the remaining capacity and operational state of the bin at the monitoring station; and
  (f) dispatching a vehicle to the site of a bin when the display indicates that the bin requires emptying or repair.

12. The method of claim 11 further comprising the step of transmitting signals to the monitoring station indicating that the bin has been emptied.

13. The method of claim 12 further comprising the step of displaying the time and date that a bin was last emptied.

14. The method of claim 11 further comprising the step of not transmitting signals to the monitoring station indicating the remaining capacity of the bin again until after the bin has been emptied.

15. The method of claim 11 further comprising the step of displaying an icon when a power or sensor failure is detected at a bin.

16. The method of claim 15 further comprising the step of clearing the displayed icon when the power or sensor failure has been corrected.

17. The method of claim 11 further comprising the step of storing the transmitted level signals and operational state signals.

18. The method of claim 11 further comprising the step of periodically transmitting a signal indicating the status of the electronics of the bin.

19. The method of claim 11 further comprising the step of periodically causing the station display to show the last empty time and date of each bin, whether a failure icon is associated with each bin and the current content level of each bin.

20. The method of claim 11 wherein the bin has a movement detector and further comprising the step of transmitting a signal to the central monitoring station indicating an unauthorized access attempt on the bin when the movement detector detects that the bin has been tipped or turned over.

* * * * *